UNITED STATES PATENT OFFICE.

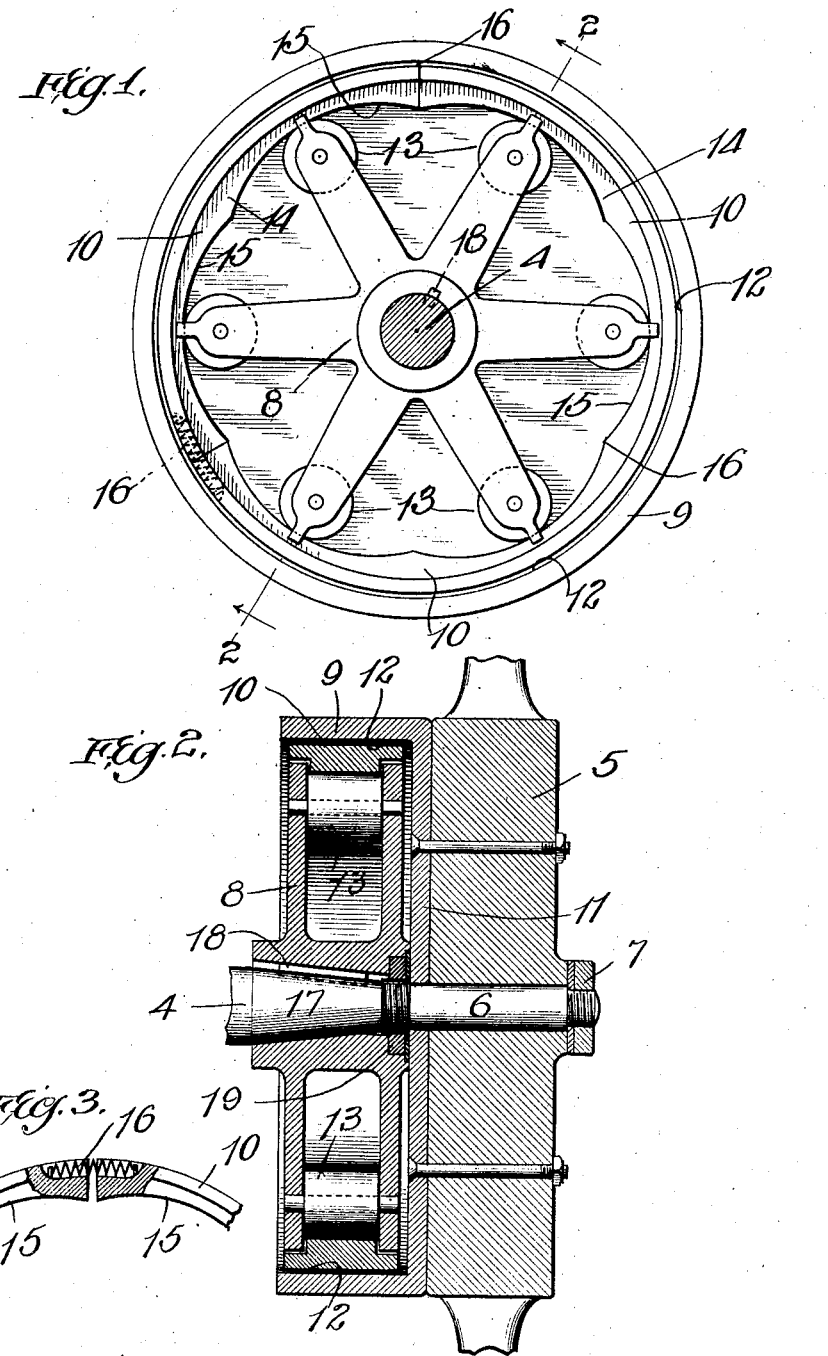

AXEL R. LE MOON, OF CHICAGO, ILLINOIS.

FRICTION DRIVING-CLUTCH.

No. 880,084.     Specification of Letters Patent.     Patented Feb. 25, 1908.

Application filed April 11, 1907. Serial No. 367,646.

REISSUED

*To all whom it may concern:*

Be it known that I, AXEL R. LE MOON, a citizen of the United States of America, and a resident of Chicago, county of Cook, State of Illinois, have invented certain new and useful Improvements in Friction Driving-Clutches, of which the following is a specification.

The main object of this invention is to provide a simple, efficient and improved form of driving clutch particularly adapted for use in connecting the driving wheels of motor driven vehicles with their driving shafts, being so arranged as to transmit the full power of the driving shaft to its wheels and at the same time permit either of the wheels to freely rotate at a speed in excess of that of the driving axle when driven in either direction and thereby prevent "skidding" of the vehicle in turning corners when the pavement is slippery and also to compensate for any difference in the diameter of the wheels due to a difference in the inflation of the tires or the distribution of the load thereon, and thereby insure that the vehicle follows a true course. This object is accomplished by the device shown in the accompanying drawings, in which Figure 1 is an elevation of a driving clutch constructed according to this invention. Fig. 2 is a section on the line 2—2 of Fig. 1. Fig. 3 is a detail showing the tension spring connection between adjacent driving shoes.

In the drawings, 4 designates the rear or driving axle of a motor driven vehicle and 5 represents the hub of one of the driving wheels. The wheel is loosely journaled upon the part 6 of the axle and is retained thereon by means of the usual lock nut 7. In the form shown, the clutch comprises a driving member 8 rigidly mounted on the axle 4, a driven member 9 rigidly mounted on the hub of the wheel and a series of segmental shoes 10 interposed between the driving member 8 and the driven member 9 and adapted to become wedged between said members to secure them in driving relation to each other. The driven member 9 is preferably cup-shaped as shown in the drawings and comprises a disk or plate 11 which is rigidly bolted to the hub 5 of the wheel and a flange having an inner annular friction surface 12. The friction surface 12 is preferably cylindrical and the driven member is open on the side toward the vehicle body so that the wheel may be readily removed.

The driving member 8 has thereon a series of projections, preferably in the form of radially disposed forked arms within which anti-friction rollers 13 are journaled on axes substantially parallel with and equally distant from the shaft 4. The outer surface of each of the shoes 10 is of cylindrical curvature and fits the inner friction surface 12 of the driven member 9. The shoes 10 are preferably of T-shaped transverse section so as to present a broad surface to the friction surface 12 and to provide a stiffening web somewhat narrower than the rim of the shoe. The inner surface of the web 14 comprises two concave cam surfaces 15 respectively located adjacent to opposite ends of the shoe. These concave surfaces correspond in angular spacing with the angular spacing of the anti-friction rollers 13 on the member 8, there being two friction rollers on said member for each shoe 10. The surfaces 15 are preferably of circular curvature, of less diameter than the path described by the outermost point of the roller 13 in its rotation around the axis of the shaft 4, and each of the surfaces 15 is eccentric with respect to the axis 4 and so disposed that its corresponding end of its shoe 10 will be urged toward the friction surface 12 when the member 8 is rotated about its axis in either direction with respect to the shoe 10. The two anti-friction rollers which engage each shoe therefore tend to cause both the middle and one end of the shoe to be simultaneously forced outward against the friction surface 12, thus insuring much more rapid action than would be the case if there were but one such cam surface on each shoe. This permits of greater clearance between the shoe and the driven member when not in driving contact with each other with a minimum amount of lost motion between the driving and driven members.

The opposite ends of adjacent shoe segments are connected together by tension springs 16, as shown in Fig. 3. These tend to urge the shoes normally inward and out of contact with the friction surface 12. The springs 16 are preferably short helical springs seated in grooves in the periphery of the shoes 10 and having their opposite ends secured to adjacent shoes.

The member 8 preferably has a conical bore fitting the conical part 17 of the shaft 4 and is secured against rotation by means of a key 18. The member 8 is forced home upon the conical seat by means of a lock nut 19 threaded on the shaft 4, and permitting the ready removal of the member 8.

The operation of the device shown is as follows: The parts are shown in the drawings in the position in which the driven member is free to rotate independently of the driving member. This is the normal position when the vehicle is at rest and also corresponds to the position of the parts when the vehicle wheel is being rotated, through contact with the road bed, at a greater angular speed than that of the shaft 4. When the shaft is started, the inertia of the shoes 10 tends to hold them stationary and the friction rollers 13 accordingly roll along the cam surfaces 15 and wedge the friction shoes into driving contact with the surface 12 regardless of the direction of rotation of the shaft 4. If the rotation of the shaft 4 is reversed, the frictional engagement between the surface 12 and the shoes 10 together with the inertia of said shoes tends to cause them to continue to travel with the wheel and the friction rollers 13 accordingly instantly engage the opposite sides of the friction surfaces 15. If for any cause, such as, passing around a corner, unequal inflation of the tires, uneven distribution of load between the two driving wheels, or irregularities of the road bed, the wheel tends to travel faster than it is driven by the shaft, the shoes 10 will tend to be carried along with the wheel but such movement brings the anti-friction rollers 13 opposite the middle points of the cam surfaces 15 and permits the springs 16 to withdraw the shoes 10 from frictional engagement with the axis 12, leaving the wheel free to rotate independently of the axis 4. The two anti-friction rollers which are in engagement with each shoe at this time insure that the shoe is properly supported so as to prevent its accidental tilting and a corresponding tendency to resist the free rotation of the wheel. As soon as the wheel lags to the slightest degree behind the angular speed of the shaft 4, the rollers 13 instantly travel toward the corresponding side of the cam surfaces 15 and wedge the shoes again into gripping contact with the surface 12. The friction between the rollers 13 and the surfaces 15 is so little that the clutch instantly compensates for changes of speed, releasing engagement between the driving and driven members when the driven member tends to exceed the speed of the driving member and reëngaging such members when the driven member tends to lag.

What I claim as my invention and desire to secure by Letters Patent is:

1. The combination of a driving member and a driven member separately journaled to rotate about the same axis, a friction shoe loosely mounted between said members and having thereon two cam surfaces located in different angular positions with respect to the axis of said members, one of said members having thereon a pair of projections angularly spaced with respect to said axis to correspond with the angular spacing of said cam surfaces, said cam surfaces and projections being adapted to urge said shoe toward said driven member through the relative rotation of said shoe and driving member.

2. The combination of a driving member and a driven member separately journaled to rotate about the same axis, a friction shoe loosely mounted between said members and having thereon two cam surfaces located in different angular positions with respect to the axis of said members, one of said members having thereon a pair of projections angularly spaced with respect to said axis to correspond with the angular spacing of said cam surfaces, said cam surfaces being exactly alike and being similarly disposed with respect to said axis and to the adjacent surface of said driven member and said projections being alike and equally distant from said axis and adapted to coact with said cam surfaces to urge said shoe toward said driven member through the relative rotation of said shoe and driving member.

3. The combination of a driven member having an inner annular friction surface, a driving member journaled concentrically within said driven member and having thereon a pair of projections angularly spaced with respect to the axis of said members, a friction shoe having its outer periphery shaped to fit said friction surface of said driven member and having a pair of concave cam surfaces on its inner surface spaced angularly to correspond with the angular spacing of said projections, said cam surfaces and projections being adapted to coact with each other to force said shoe into frictional contact with said friction surface through the rotation of said driving member in either direction with respect to said shoe and means normally urging said shoe out of engagement with said friction surface.

4. The combination of a driven member having an internal annular friction surface, a driving member journaled concentrically within said friction surface, a pair of anti-friction rollers journaled on said member on axes parallel with the axis of said members and angularly spaced with respect to said axis, a friction shoe interposed between the friction surface on said driven member and said rollers, the outer surface of said shoe being shaped to fit said friction surface and the inner surface of said shoe comprising two concave cam surfaces angularly spaced to coact respectively with said anti-friction rollers and suitably shaped to cause said shoe to be urged into gripping contact with the friction surface on said driven member through the rotation of said driving member in either direction with respect to said shoe, and means normally urging said shoe out of engagement with said friction surface.

5. The combination of a driven member having an internal annular friction surface; a driving member journaled concentrically within said surface; an annular series of segmental friction shoes opposed to the friction surface on said driven member, each having an outer surface fitting said friction surface and having an inner surface comprising a pair of concave cam surfaces respectively located adjacent to opposite ends of the shoe; a plurality of anti-friction rollers, two for each shoe, journaled on said driving member and angularly spaced to correspond with the angular spacing of said cam surfaces, said cam surfaces being so shaped as to cause each of said shoes to be urged into gripping engagement with the friction surface on said driven member through the rotation of said driving member in either direction with respect to said series of shoes; and means normally urging said shoes out of such gripping engagement.

6. The combination of a driving shaft; a wheel loosely journaled thereon and having rigid thereon an internal annular friction surface; a driving member rigidly mounted on said shaft and located within said friction surface; a shoe interposed between said friction surface and driving member, having its outer surface fitting said friction surface and having its inner surface comprising a pair of cam surfaces respectively located adjacent to opposite ends of said shoe; a pair of anti-friction rollers journaled on said driving member and spaced apart angularly to correspond with the spacing of said cam surfaces; said cam surfaces being so formed as to cause said shoe to be urged into contact with said friction surface through the relative rotation of said driving member and shoe; and means normally urging said shoe out of engagement with said friction surfaces.

7. The combination of a driving axle, a wheel loosely journaled thereon, an annular flange rigidly secured to said wheel and having an internal cylindrical friction surface, a driving member rigidly secured to said axle within said flange, an annular series of segmental friction shoes interposed between said flange and driving member, each having an outer surface fitting the friction surface of said flange and having an inner surface comprising a pair of cam surfaces spaced apart angularly toward opposite ends of such shoe, a plurality of rollers journaled on said driving member and angularly spaced to correspond with the spacing of said cam surfaces, means normally urging said friction shoes out of engagement with the friction surface of said flange, and said shoes and driven member having parts overlapping each other and adapted to prevent the removal of said shoes while said driving member is in its normal position within said flange.

8. The combination of a driven axle; a wheel loosely journaled thereon and having an internal annular friction surface; a member rigid on said axle and located concentrically inward of said friction surface; an annular series of friction shoes interposed between said friction surface and said member, each having an outer surface fitting said friction surface and each having an inner surface comprising a pair of similar cam surfaces respectively located adjacent to opposite ends of such shoe; a plurality of rollers, two for each shoe, journaled on said driving member, being spaced apart angularly to correspond with the relative spacing of said cam surfaces, said driving member having parts overlapping said shoes at each side thereof and adapted to prevent said shoes from shifting in an axial direction.

Signed at Chicago this 5th day of April 1907.

AXEL R. LE MOON.

Witnesses:
K. M. IMBODEN,
E. A. RUMMLER.